(12) United States Patent
Lee

(10) Patent No.: US 7,069,346 B2
(45) Date of Patent: Jun. 27, 2006

(54) APPARATUS AND METHOD FOR AUTOMATIC ROUTER CONFIGURATION

(75) Inventor: Jeong Kwon Lee, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 788 days.

(21) Appl. No.: 09/938,536

(22) Filed: Aug. 27, 2001

(65) Prior Publication Data

US 2002/0024965 A1 Feb. 28, 2002

(30) Foreign Application Priority Data

Aug. 28, 2000 (KR) .............................. 2000-50091

(51) Int. Cl.
*G06F 15/16* (2006.01)
(52) U.S. Cl. ...................... 709/250; 709/222; 709/238; 370/359
(58) Field of Classification Search ................ 709/222, 709/238, 250; 710/17; 370/359; 439/620, 439/890
See application file for complete search history.

(56) References Cited

U.S. PATENT DOCUMENTS

| 4,764,868 | A | * | 8/1988 | Ketelhut et al. ............... 710/12 |
| 5,794,014 | A | * | 8/1998 | Shetty et al. .................. 703/25 |
| 5,802,328 | A | * | 9/1998 | Yoshimura ................... 710/301 |
| 6,301,366 | B1 | * | 10/2001 | Malcolm et al. ............ 381/119 |
| 6,636,907 | B1 | * | 10/2003 | Gaillard et al. ............... 710/25 |

FOREIGN PATENT DOCUMENTS

EP 0 310 788 A2 * 12/1989
JP 01315856 A * 12/1989

* cited by examiner

*Primary Examiner*—Beatriz Prieto
(74) *Attorney, Agent, or Firm*—Fleshner & Kim, LLP

(57) ABSTRACT

An apparatus and method of automatic router configuration is disclosed when a cable of the router in operation is replaced or a protocol configuration is changed, a PLD automatically senses the change and initializes parts of the system to normalize communication environments without turning off the power. A TVS circuit is provided to absorb and prevent an electrical shock so that cable replacement is made possible in the power-on state.

25 Claims, 3 Drawing Sheets

APPARATUS AND METHOD FOR AUTOMATIC ROUTER CONFIGURATION

BACKGROUND OF THE INVENTION

1. Field of the Invention

The present invention relates to a communication environment configuration for a router, and more particularly, to a apparatus and method for automatic router configuration.

2. Background of the Related Art

FIG. 1 is a drawing illustrating the relationship between a router and a data circuit terminating equipment (DCE).

The DCE is an apparatus for establishing, protecting, and releasing a connection between data terminal equipment DTE and a line, or signal exchange, signal encoding, etc. For analog transmission (for example, in a telephone-type data network), the DCE corresponds to a modem. For digital transmission, the DCE corresponds to a data service unit (DSU). The DTE is referred to as a terminal apparatus connected to a data communication line, which can include a computer in a communication network.

The interface between the DTE and the DCE is the definition of boundaries or boundary conditions between DTE and DCE placed at a subscriber's line terminal unit in a data communication network, for example, physical and electrical conditions relating to types of data lines or control lines for connecting the DTE and the DCE. The type of the interface includes V series analog transmission interfaces using a telephone network, X series digital transmission interface, and RS-232 defined by the EIT (Electrical Industries Association) according to the recommendation of the ITU.

A router is one particular kind of DTE, and is a connection apparatus between networks having the same transmission protocol. The router can easily be adapted to a large scale network configuration since it sends packets by selecting the most efficient path, performs flow control and various network management functions, and is not particular about the shape of a network.

FIG. 2 is a block diagram of a router according to the related art. As illustrated in FIG. 2, the related art router includes a built-in CPU or a serial communication controller (SCC) 11, a multi-protocol transceiver 12, a connector 13, and a data buffer 14, among which signal lines are connected. Of these signal lines, Rx and RxC lines are used for receiving data, while Tx and TxC lines are used for transmitting data. Control signal lines are used for signals representing the start and end of data transmission and reception. Depending on the protocol, the RxC and TxC may not be used.

The built-in CPU or serial communication controller 11 is an apparatus for processing data transmitted from a communication network and performing serial communication control function. The multi-protocol transceiver 12 is an apparatus capable of transmitting and receiving more than two protocol signals, which can transmit and receive digital signals, and can receive signals during transmission if a transmission frequency and a receiving frequency are different from each other.

The connector 13 provides a cable port to connect with the DCE, and different cables are connected to the cable port according to a hardware (H/W) protocol (or an interface).

The operation of the related art router will now be described with reference to the accompanying drawings.

The related art router operates according to a connection environment and a H/W protocol set when power is initially applied. Thus, in order to change the H/W protocol during the operation of the router, the router must be initialized by turning off the power, connecting the corresponding cable and then starting the router.

The built-in CPU or serial communication controller 11 sends a chip select (CS) signal to the data buffer 14 in order to recognize the H/W protocol from the cable connected to a wide area communication network during the initialization process. The data buffer 14 enabled upon receipt of the CS signal, and discriminates a H/W protocol through a mode [2:0] line to send the same to the built-in CPU or serial communication controller 11. The built-in CPU or serial communication controller 11 completes initialization by executing a program corresponding to the transmitted protocol mode.

The process of discriminating a H/W protocol will now be described with reference to FIG. 1. As shown in FIG. 1, W1, W2 . . . Wn represent holes of the connector 23 of the router connected to the mode line [2:0]. The holes are engaged with P1, P2 . . . Pn, which represent pins of the connector 33 of the DCE when the router is connected to the connector 33 of the DCE (or cables). At this time, the pins of the DCE connector 33 are expressed in 3-digit bits having a value of high and low level according to whether the pins are in the GROUND state or in the OPEN state. For example, if the 3-digit bits are [1 0 0], the first pin has a high level value set by a pull-up resistor R1 16 of a protocol mode line in the open state, and the second and third pins have a low level value by connection with GROUND. Thus, DCE connector pins P1, P2, and P3 are set to open or ground to thereby adjust the identification code of a protocol mode value.

Therefore, the protocol mode [1 1 1] represents a state in which cables are not connected, [1 0 0] represents the V.35 connection mode, and [1 1 0] represents the connection mode. If there is any identification code to be added, it is encoded so as to avoid the redundancy of the existing mode.

Since the related art router cannot recognize a change in protocol mode during operation, it must be restarted after installing cables of the corresponding protocol mode in the power-off state. Consequently, if a problem occurs in a private network, it is difficult to rapidly convert the network into a public network or an ISDN network. In addition, the restarting of the router inhibits the stability of a network, and increases maintenance cost, since additional manpower for network management is needed. Moreover, the replacement of cables during the operation of the router can cause an instantaneous electrical shock inside the router, thereby damaging the circuit in the router and reducing the life span of the router.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

is another object of the present invention to provide a router that provides the convenience of maintenance and repair. It is another object of the present invention to provide a router that enhances, the stability of a network. It is another object of the pre sent invention to provide a router that can be automatically reconfigured with no need to restart the power of the router according to a change in cable connection state when connecting to a wide area network (WAN).

It is another object of the present invention to provide a router that includes system environment reconfiguration logic according to a change in connection interface between a router and DCE.

To achieve at least the above objects in whole or in part, there is provided an apparatus for automatic router configuration that includes a connector for providing a connection port connected to data circuit terminating equipment (DCE), a multi-protocol transceiver for transmitting and receiving more than two protocol signals through the connector, a CPU connected to the multi-protocol transceiver for processing data according to the communication environment of a connection network and having a serial communication control function, a programmable logic device (PLD) for sensing the change in connection state of the connector through a predetermined control line and transferring the sensed information to the CPU, and a transient voltage suppressor (TVS) for absorbing an electric shock generated upon connecting or disconnecting the connector.

To further achieve at least the above objects in whole or in part, there is provided a method of automatic router configuration, which includes a step in which a PLD senses the connection and disconnection of a connector for connecting to DCE, a step of discriminating a H/W protocol if the change in the state of the connector is sensed, a step in which the PLD informs a CPU of the change in the state of the connector by sending an interrupt request signal to the CPU, a step in which the CPU sends a response signal for the interrupt request signal to the PLD and requesting the PLD to send a H/W protocol mode value, a step in which the PLD transmits the H/W protocol mode value to the CPU, and a step in which the CPU initializes parts of the apparatus and normalizes a communication environment in consideration of the sensed information.

To further achieve at least the above objects in whole or in part, there is provided an apparatus for automatic router configuration, including a connector configured to provide a connection port to a data circuit terminating equipment (DCE), a multi-protocol transceiver coupled to the connector and configured to transmit and receive a plurality of protocol signals through the connector, a CPU having a serial communication control function coupled to the multi-protocol transceiver to process data according to the communication environment of a connection network, and a programmable logic device (PLD) coupled to sense a change in a connection state of the connector through a prescribed control line and to transfer the sensed information to the CPU.

To further achieve at least the above objects in whole or in part, there is provided a method of automatically configuring a router, including sensing a change in a connection state of a connector between a router and a data circuit terminating equipment (DTE), transferring sensing information to an internal CPU if a change in the connection state of the connector is sensed, and initializing parts of the router and normalizing communication environments based on the sensing information.

To further achieve at least the above objects in whole or in part, there is provided a method of automatic router configuration, including sensing a connection and disconnection state of a connector configured to connect to a data circuit terminating equipment (DCE) by a programmable logic device (PLD), determining a hardware protocol if a change in the state of the connector is sensed, sending an interrupt request signal to a CPU to inform the CPU of the change in the state of the connector, sending a response to the interrupt request signal from the CPU to the PLD to request the PLD to send a hardware protocol mode value to the CPU, transmitting the hardware protocol mode value from the PLD to the CPU, and initializing parts of the router and normalizing a communication environment based on the stated information.

To further achieve at least the above objects in whole or in part, there is provided a data terminal equipment (DTE) device, including a connector configured to provide a connection port to a data circuit terminating equipment (DCE), a multi-protocol processor coupled to the connector and configured to transmit and receive two or more protocol signals through the connector and to initialize parts of the DTE based on a connection state of the connector to the DCE while power to the DTE is maintained, and a CPU having a serial communication control function coupled to the multi-protocol processor to process data according to the communication environment of a connection network.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The preferred embodiment of the present invention will now be described with reference to the accompanying drawings.

Figure 1:
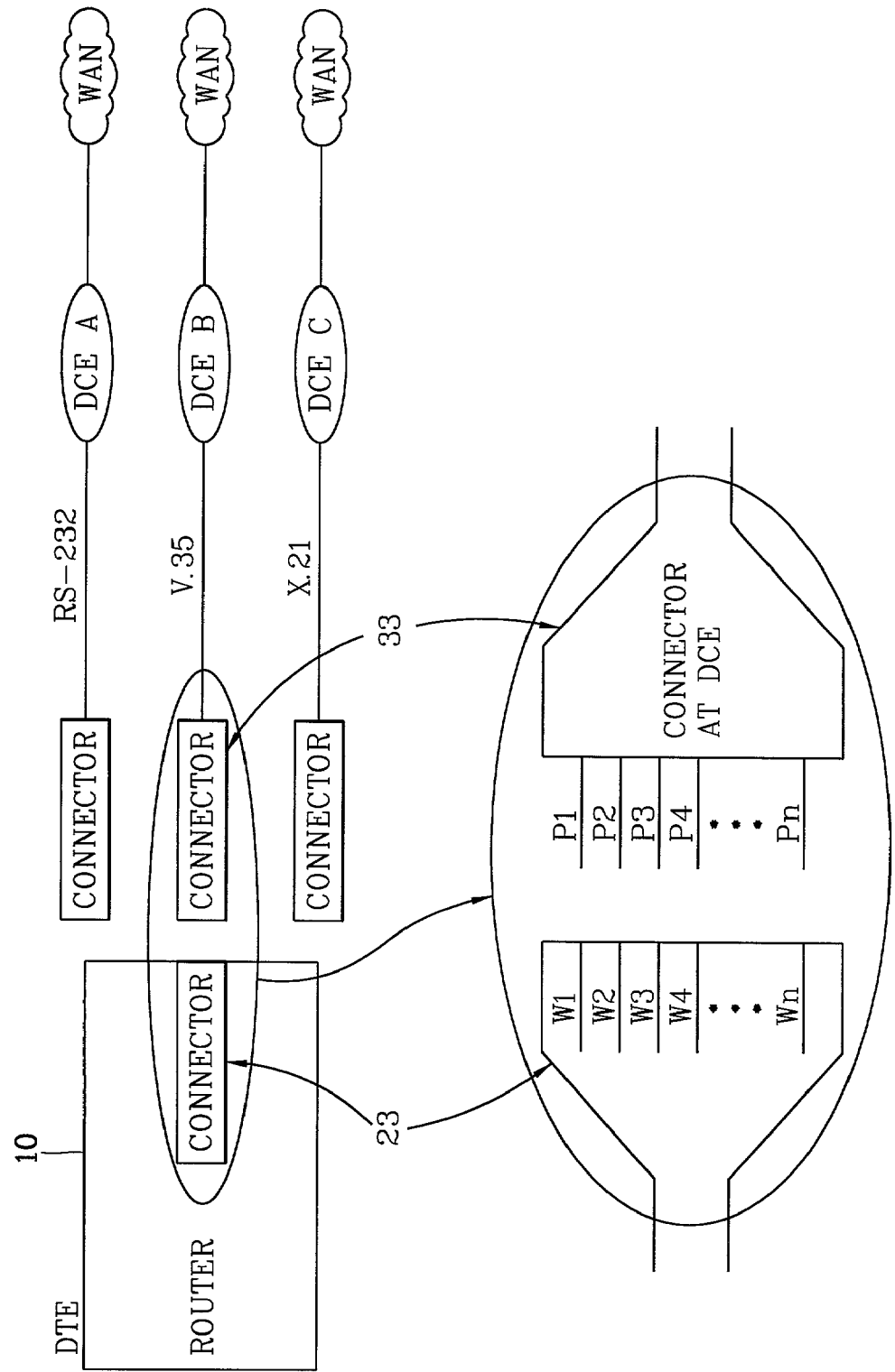
FIG. 1 is a drawing illustrating the relationship between a router and DCE.
Figure 2:
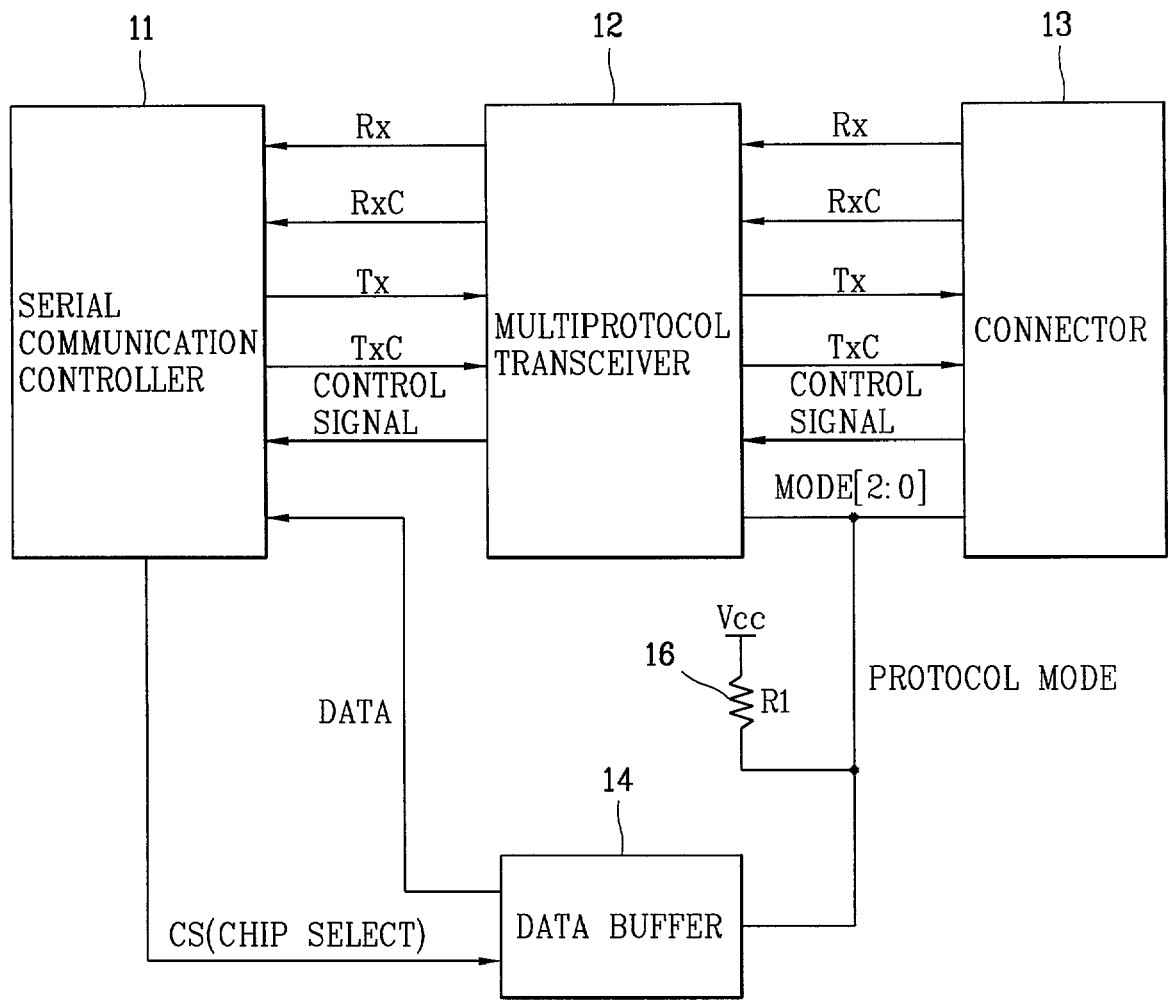
FIG. 2 is a block diagram of an interface with DCE in a router according to the related art.
Figure 3:
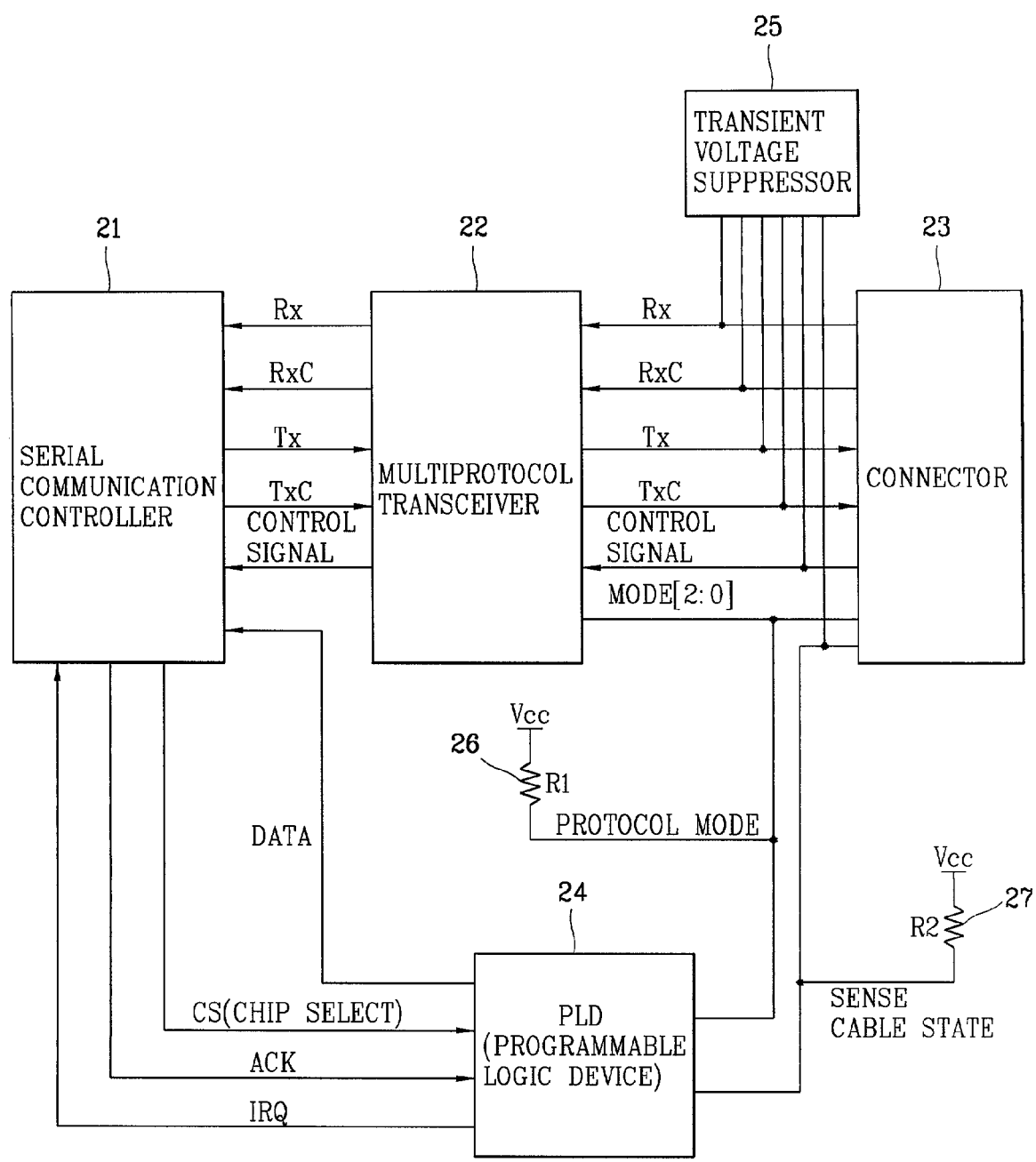
FIG. 3 is a block diagram of the internal apparatus of a router according to a preferred embodiment of the present invention.

FIG. 3 is a block diagram illustrating the internal apparatus of a router according to the preferred embodiment of the present invention. As illustrated in FIG. 3, the router preferably includes a built-in CPU or serial communication controller 21, a multi-protocol transceiver 22, and a connector 23. The router further includes a programmable logic device (PLD) 24 and a transient voltage suppressor (TVS) 25.

The built-in CPU or serial communication controller 21 processes data transmitted from a communication network and executes a program according to a H/W protocol.

The multi-protocol transceiver 22 is an apparatus that makes it possible to transmit and receive more than two protocols between the built-in CPU or serial communication controller 21 and the connector 23 The connector 23 is an apparatus for providing a connection port between the router and DCE.

The PLD 24 is an apparatus capable of programming the corresponding operation logic for the execution of a particular operation. The PLD 24 has an operation logic programmed to sense whether the connector 23 is in the disconnection state or in the connection state, or what a H/W protocol is like, and informs the built-in CPU or serial communication controller 21 of the same. Pull-up resistors R1 26 and R2 27 connected to the PLD 24 are connected to a positive power voltage (Vcc), and prevent erroneous operation when an operation signal is not transmitted.

The TVS 25 functions to shut off temporary voltage interference, which protects the router by absorbing an eletrical shock generated upon connecting the connector 23 during the operation of the router.

An operation of the preferred embodiment of the thusly configured apparatus will now be described. There are occasions when cables are replaced or a H/W protocol is changed during the operation of the router. In such a situation, the preferred embodiment is devised to automatically recognize the change and need not re-initialization.

When changing cables, the instant that the connector 23 at the router is disconnected with the connector 33 at DCE, the PLD 24 preferably senses the change in the state of the connector 23 though a cable state sensing line, and discriminates a H/W protocol through a protocol mode line. In addition, to inform the built-in CPU or serial communication controller 21 of the change in the state of the connector 23, the PLD 24 transmits an interrupt request (IRQ) signal to the CPU or serial communication controller 21. The built-in CPU or serial communication controller 21 then sends an acknowledgment (ACK) signal in response to the IRQ, and sends a CS signal requesting a H/W protocol mode value transmission. After receiving the protocol mode information from the PLD 24, the built-in CPU or serial communication controller 21 normalizes communication environments and system operation by initializing parts of the apparatus.

The sensing of the change in the state of the connection cable will now be described in more detail.

A hole of the connector 23 at the router connected to the cable state sensing line is engaged with a corresponding pin while coupling with the connector 2 at the DCE. In the preferred embodiment, pin P4 is a pin connected to ground all the time, regardless of the type of the connector. Thus, the open state of pin P4 logically represents no cable connection, and has a logical high voltage value set by the pull-up resistor R2 27 of the cable state sensing line. The ground state has a logical low voltage value representing a cable connection between W4 and P4.

The method of discriminating a H/W protocol is similar to the method in the related art router, except that there is no H/W protocol mode value representing that cable connection is not achieved.

The router of the preferred embodiment has many advantages. For example, when the cable of the router in operation is replaced for any reason, such as deterioration, backup, or H/W protocol configuration, the change is automatically sensed by the PLD 24 for thereby initializing parts of the system and normalizing communication environments without turning off the power.

Additionally, by having a TVS 25 circuit for absorbing and preventing electrical shock, it is possible to perform cable replacement in the power-on state. Consequently, the router system can be operated more stably. Additionally, because the above-described process is automatically performed, maintenance and repair of the system is made more convenient.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for automatic router configuration, comprising:
   a connector configured to provide a connection port to a data circuit terminating equipment (DCE);
   a multi-protocol transceiver coupled to the connector and configured to transmit and receive a plurality of protocol signals through the connector;
   a CPU having a serial communication control function coupled to the multi-protocol transceiver to process data received from or for transmission to a communication network according to a communication environment;
   a programmable logic device (PLD) coupled to sense a change in a connection state of the connector and to transfer information regarding the sensed change to the CPU; and
   an interrupt request (IRQ) signal line, an acknowledgment (ACK) signal line, a chip select (CS) signal line, a protocol mode line, and a cable state sensing line, wherein the IRQ signal line, the ACK signal line, and the CS signal line are coupled between the PLD and the CPU, and the protocol mode line and the cable state sensing line are coupled between the PLD and the connector, and wherein the IRQ signal line and the ACK signal line each separately comprise a control line to carry information between the CPU and the PLD relating to a change in the connection state of the connector, wherein the state is one of connection and disconnection.

2. The apparatus of claim 1, wherein the PLD uses a pull-up resistor to sense a connection and disconnection state of the connector.

3. The apparatus of claim 1, wherein the PLD uses a pull-up resistor to determine a hardware protocol.

4. The apparatus of claim 1, further comprising a transient voltage suppressor (TVS) coupled to absorb an electric shock generated upon connecting or disconnecting the connector with a corresponding receptacle.

5. The apparatus of claim 1, wherein the PLD is coupled to pins or holes of the connector.

6. A method of automatically configuring a router, comprising:
   sensing a change in a connection state of a connector between a router and a data circuit terminating equipment (DTE);
   transferring sensing information to an internal CPU when a change in the connection state of the connector is sensed; and
   initializing parts of the router and normalizing communication environments based on the sensing information, wherein transferring the sensing information to the internal CPU comprises:
      transmitting an interrupt request (IRQ) signal to the CPU when the change in the connection state of the connector is sensed:
      sending an acknowledgment signal from the CPU and requesting that a hardware protocol mode value be transmitted to the CPU; and
      transmitting a protocol connection mode value to the CPU.

7. The method of claim 6, wherein sensing the change in the connection state of the connector comprises:

sensing a change of a connected or disconnected state of the connector; and determining a hardware protocol when the state of the connector has been changed.

8. The method of claim 7, wherein the connected state is determined by a low logic state of a prescribed connection pin of the connector, and the disconnected state is determined by a high logic state of the prescribed connection pin of the connector.

9. The method of claim 7, wherein a programmable logic device (PLD) senses the change of state and transfers the sensed information to the CPU.

10. The method of claim 9, wherein the PLD uses a pull-up resistor to sense the connection and disconnection states of the connector.

11. The method of claim 9, wherein the PLD uses a pull-up resistor to determine a hardware protocol.

12. The method of claim 6, wherein a programmable logic device sends the IRQ signal and the protocol connection mode value to the CPU.

13. The method of claim 6, wherein the sensing information is automatically transferred to the internal CPU when the change in the connection state is sensed.

14. A method of automatic router configuration, comprising:

sensing a connection and disconnection state of a connector configured to connect to a data circuit terminating equipment (DCE) by a programmable logic device (PLD);

determining a hardware protocol when a change in the state of the connector is sensed;

sending an interrupt request signal to a CPU to inform the CPU of the change in the state of the connector;

sending a response to the interrupt request signal from the CPU to the PLD to request the PLD to send a hardware protocol mode value to the CPU;

transmitting the hardware protocol mode value from the PLD to the CPU; and initializing parts of the router and normalizing a communication environment based on information transmitted to the CPU.

15. The method of claim 14, wherein the hardware protocol is determined by at least one of the PLD and the CPU.

16. The method of claim 14, further comprising absorbing an electrical shock generated during connection and disconnection of the router.

17. The method of claim 14, wherein the router is configured to automatically sense a change in hardware protocol without switching off power to the router.

18. The method of claim 14, wherein the interrupt request message is automatically sent to the CPU when the PLD senses a change in the connection and disconnection state.

19. A data terminal equipment (DTE) device, comprising:

a connector configured to provide a connection port to a data circuit terminating equipment (DCE);

a multi-protocol processor coupled to the connector and configured to transmit and receive two or more protocol signals through the connector and to initialize parts of the DTE after a connection of the connector to the DCE while power to the DTE is maintained; and a CPU having a serial communication control function coupled to the multi-protocol processor to process data received from or for transmission to a communication network according to a communication environment of a connection network, wherein the multi-protocol processor includes a programmable logic device (PLD) coupled to receive connection state and hardware protocol information from the connector and transmit an interrupt request (IRQ) signal to the CPU in accordance with the state and protocol information, and the PLD to transmit a protocol mode value to the CPU after receiving an acknowledgment to the IRQ from the CPU.

20. The device of claim 19, wherein the multi-protocol processor comprises:

a multi-protocol transceiver to transmit and receive signals through the connector; and a connection discrimination unit to initialize parts of the DTE based on the connection state of the connector.

21. The device of claim 19, wherein a first pull-up resistor is used to determine the hardware protocol information, and wherein a second pull-up resistor is used to determine the connection state.

22. The device of claim 19, further comprising a transient voltage suppressor, coupled to the connector to absorb an electrical shock generated upon connecting the connector during operation of the DTE.

23. The device of claim 19, wherein the PLD is coupled to the connector using a protocol mode line and a state sensing line, and wherein the PLD is coupled to the CPU using an IRQ signal line, an ACK signal line, and a data line.

24. The device of claim 19, further comprising at least one resistor coupled between the connector and the multi-protocol processor to sense at least one of a state of a cable between the connector and the multi-protocol processor and a protocol mode.

25. The device of claim 19, wherein the PLD is coupled to pins or holes of the connector.

* * * * *